United States Patent [19]

Mackellar

[11] Patent Number: 5,665,187

[45] Date of Patent: Sep. 9, 1997

[54] METHOD FOR CONNECTING COMPOSITE DRIVE SHAFT TO ANNULAR MEMBER

[75] Inventor: Lawson Mackellar, Bucks, United Kingdom

[73] Assignee: Turboflex Limited, Buckinghamshire, England

[21] Appl. No.: 464,064

[22] Filed: Jun. 5, 1995

Related U.S. Application Data

[62] Division of Ser. No. 38,281, Mar. 29, 1993, Pat. No. 5,421,781.

[30] Foreign Application Priority Data

Apr. 3, 1992 [GB] United Kingdom ............... 9208069

[51] Int. Cl.$^6$ ............... B29C 65/54; B29C 65/56; B29C 65/72
[52] U.S. Cl. ............... 156/91; 29/525.13; 156/294; 156/305; 264/262; 403/28; 403/265; 403/267; 403/273
[58] Field of Search ............... 156/91, 92, 86, 156/305, 294, 293; 264/262; 29/458, 525, 469.5, 525.13; 403/28, 265, 266, 267, 268, 273; 285/397, 403, 915, 381, 398, 423; 280/281.1

[56] References Cited

U.S. PATENT DOCUMENTS

| 2,564,915 | 8/1951 | Nelson | 285/403 X |
|---|---|---|---|
| 3,472,538 | 10/1969 | Vincent et al. | 285/403 X |
| 4,190,479 | 2/1980 | Smith | 156/294 |
| 4,275,122 | 6/1981 | Fisher | 403/265 |
| 4,279,275 | 7/1981 | Stanwood et al. | 464/181 X |
| 4,662,655 | 5/1987 | Fliervoet et al. | 285/915 X |
| 4,663,819 | 5/1987 | Traylor | 464/181 |
| 4,722,717 | 2/1988 | Salzman et al. | 464/181 |
| 4,792,320 | 12/1988 | Nickel | 464/181 |
| 5,052,848 | 10/1991 | Nakamura | 403/267 |
| 5,087,147 | 2/1992 | Petrzelka et al. | 403/265 |
| 5,160,688 | 11/1992 | Hockett | 285/915 X |

FOREIGN PATENT DOCUMENTS

| 0044380 | of 1981 | European Pat. Off. | |
| 46869 | 3/1982 | European Pat. Off. | 464/181 |
| 2523541 | 9/1983 | France | 280/281.1 |
| 1682656 | 10/1991 | U.S.S.R. | 464/181 |
| 1018530 | 1/1966 | United Kingdom | 29/458 |
| 2017567 | of 1979 | United Kingdom. | |
| 2012649 | 8/1979 | United Kingdom | 403/267 |
| 2112689 | 7/1983 | United Kingdom | 156/91 |
| WO90/10816 | 9/1990 | WIPO | 156/91 |

*Primary Examiner*—Steven D. Maki
*Attorney, Agent, or Firm*—Cammarata & Grandinetti

[57] ABSTRACT

A method of forming a coupling or connecting a composite drive shaft to an annular member comprising the steps of locating the shaft over the member and injecting adhesive through holes in the shaft to bond the shaft to the member.

11 Claims, 3 Drawing Sheets

METHOD FOR CONNECTING COMPOSITE DRIVE SHAFT TO ANNULAR MEMBER

This application is a division of U.S. application Ser. No. 08/038,281, filed Mar. 29, 1993, now U.S. Pat. No. 5,421,781.

This invention relates to couplings and is more particularly concerned with a coupling in which a shaft is attached to an annular member. The coupling is particularly suitable for attaching a shaft to a flanged end or for integrally joining two shafts to form a longer shaft.

The present invention is more particularly concerned with a method of forming such a coupling and to a coupling produced thereby and is in particular concerned with a coupling using a composite drive shaft (carbon fibre).

Composite drive shafts have a number of advantages over their metal counterparts, namely weight (for equivalent strength in tubing carbon fibre is approximately 1/10 the weight of steel) and also they do not take on a thermal bow when exposed to strong sunlight. Moreover, they have a total resistance to almost all corrosive environments.

Metal tubing however, which is conventionally used for such drive shafts, comes in longer lengths and can be readily welded and non-destructively tested to check the integrity of the joint.

As yet, no practical method exists for non-destructive testing of an adhesive bond which may be used with composite drive shafts and it is therefore prudent to design a higher service factor into the joint than for a corresponding welded assembly.

It is an object of the present invention to provide an improved coupling for use with composite drive shafts.

According to one aspect of the present invention a method of forming a coupling for connecting a composite drive shaft to an annular member comprises the steps of locating the shaft over the member and injecting adhesive through holes in the shaft to bond the shaft to the member.

The shaft is preferably aligned to abut against a shoulder on the member.

The member is also preferably provided with a portion which is an interference fit with the shaft and which is located adjacent the shoulder.

The annular member is preferably profiled which assists in ensuring that the elastic limit of the adhesive is not exceeded under operating conditions of a shaft system in which the coupling is used.

Preferably after applying the adhesive, openings are drilled through the shaft, adhesive and member respectively and then locating pins, rivets or the like are applied to connect the shaft to the member.

It may be desirable to increase further the couplings strength (particularly for thick walled tube, ie greater than 4–5 mm). In this case, an external sleeve may be provided which produces a double sided joint. In the method according to the invention, this is subsequently located over the shaft and member, and adhesive is then injected through holes therein. This sleeve may be of a heat shrink material, or for optimum strength, a composite or steel outer sleeve can be used. The external sleeve of composite material or of steel is suitably profiled to locate concentrically over the shaft and to keep the stress levels below the elastic limit for the adhesive.

Preferably the outer sleeve is provided with openings which are aligned with openings respectively in the adhesive, shaft, adhesive and member and then locating pins, rivets or the like are applied to connect the layers together.

In one arrangement where the outer sleeve is used as a drill jig for the composite tube holes and replaced in the same position after injection, drilling through only requires cleaning out of the adhesive plugs and drilling the inner sleeve (minimising the number of holes in the composite tube).

Where the outer sleeve is a metal outer sleeve it can be machined undersize and heated up to slide over the shaft, providing a degree of compression on the adhesive bond once it has cooled down in position.

The external sleeve can be bonded, welded or mechanically attached to the shoulder portion of the member.

In one arrangement the adhesive is chamfered at the end of the joint preferably by means of a conformable sealing ring, lip or the like which profiles the extruded adhesive.

For certain fluid handling applications it is desirable to have a seal bearing area and in this case the outer sleeve conveniently provides a suitable bearing area.

In order to seal the coupling to avoid ingress of extraneous material, it may be encapsulated with a heat shrink bandage after formation and further heat is applied thereto to shrink the bandage into position.

In one construction the member may be provided with a flanged end. This may, for example, be used to join it to a flexible coupling.

In another arrangement, the member may be provided with an equal and opposite member formed integrally therewith to provide a shaft to shaft coupling. In this arrangement the equal and opposite members may have between them a protruding rim forming an abutment providing the respective shoulders.

According to a further aspect of the present invention is a coupling formed by the method as set forth.

According to another aspect of the present invention a coupling comprises a composite drive shaft attached to an annular member, in which the annular member is adhered to the shaft by means of an adhesive.

In this case the annular member preferably has a shoulder against which the shaft abuts, a section adjacent the shoulder with which the shaft is an interference fit and a profiled section.

Preferably the shaft is secured to the member by means of rivets, pins or the like secured through openings provided between the shaft and the member.

The invention may be performed in various ways and various embodiments will now be described by way of example with reference to the accompanying drawings in which.

Figure 1:
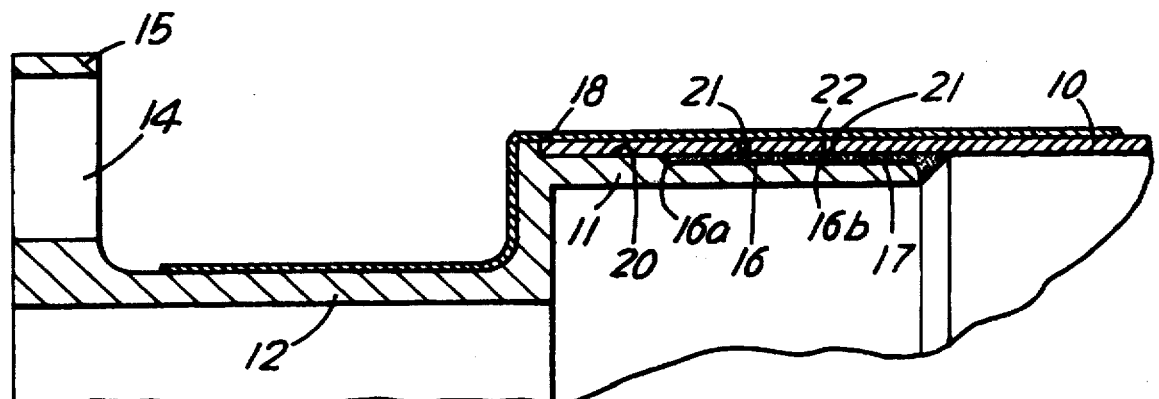
FIG. 1 is a cross section through one embodiment of a coupling according to the present invention
Figure 9:
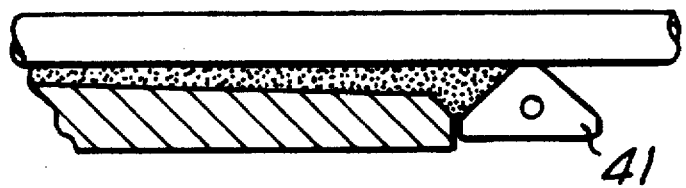
Figure 10:
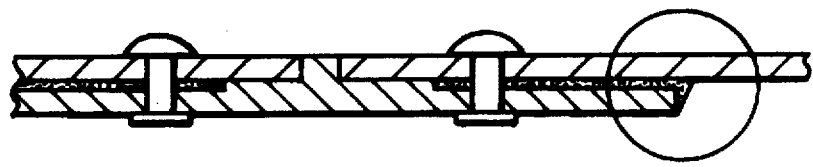

FIGS. 9 to 12 show arrangements which can be used with FIG. 10 but also may be used with the other embodiments In the coupling of FIG. 1, a shaft indicated at 10 and formed of composite material is coupled to an annular member 11 which has a flanged end coupling indicated generally at 12. The flanged end may be attached by suitable further members (not shown) in openings provided at 14 in member 15 to, for example, a flexible coupling.

The annular member 11 has on its outer periphery two taper sections 16 and 17. The section 16 is that between the numbers 16a and 16b and the section 17 between 16b and the end of the member. The section 16 is arranged to be an interference fit with the shaft 10, the end of which abuts against a shoulder 18. The shoulder 18 provides axial location for the shaft while the interference fit provides the radial location.

The shaft 10 has a number of holes drilled in it as shown at 21 which extend radially through it. These are drilled in the section beyond the interference fit portion.

The coupling is assembled as follows. After normal degreasing and cleaning, the annular member 11 is inserted into the end of the shaft 10 until it reaches the shoulder 18. Adhesive is then injected into each hole 21 in turn until it is seen to be exuding from adjacent holes. The coupling is then heated until the adhesive gels. Holes are then drilled through the shaft 10 into the annular member 11 and either a shear stem rivet or screw or the like is then inserted into each hole from the outside and pulled up against the inside wall of the annular flange. Thus a mechanical lock is provided which also locks the shaft to the member.

Finally in this embodiment, an adhesive shrink sleeve or bandage 22 is slid over the jointed region and sufficient heat applied to melt the adhesive/sealant and so as to fully encapsulate the coupling so formed. This not only prevents external moisture diffusion into the joint, but by providing a further heat curing process provides further curing or the epoxy resin as well, which being at high temperature forms a better joint in the gel.

Figure 2:
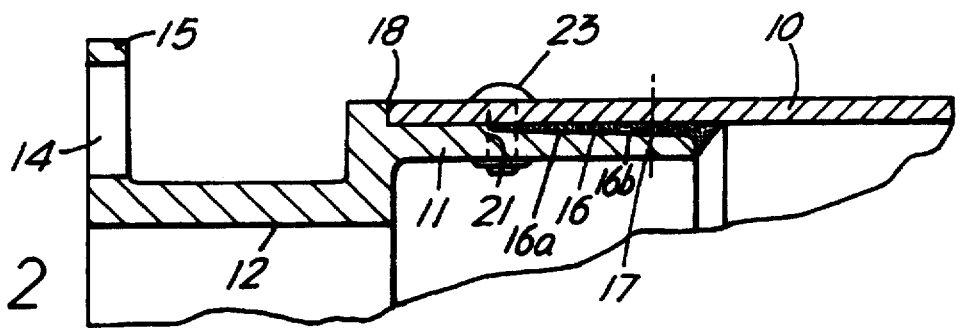
FIG. 2 is an alternative arrangement

FIG. 2, shows a similar coupling to FIG. 1 (ie, a single sided external flange) but in this case the shrink sleeve or bandage 22 is omitted. In this Figure rivets 23 are shown extending through shaft 10, adhesive and member 11.

Figure 3:
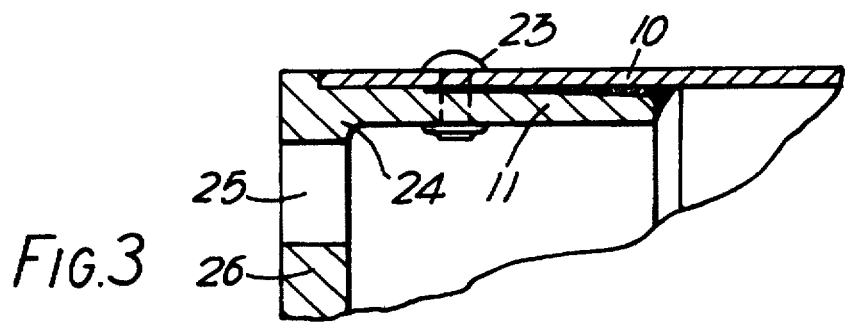
FIGS. 3 & 4 are further alternative arrangements similar to FIG. 2

FIG. 3, shows a single sided internal flange coupling. The mounting of the shaft on the flange is similar, but the flange is shown at 24 and is internal with openings 25 in a radial flange 26 for attachment to, for example, a torsionally flexible coupling.

Figure 4:
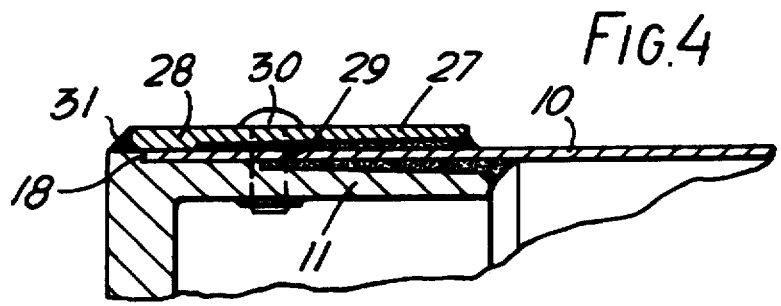

FIG. 4, shows a double sided joint in an arrangement similar to FIG. 3. In this construction the shaft 10 is secured to member 11 in similar manner by injection of adhesive.

Subsequent to this, a reinforcing additional outer sleeve which has holes pre-drilled in it, is inserted over the end of the shaft 10. The outer sleeve comprises an annular portion 27 having a profiled inner circumference to receive the adhesive and a portion 28 which fits directly over the end of the composite shaft 10 abutting the shoulder 18.

This has holes pre-drilled in it and adhesive is injected as in the previous constructions.

Holes 29 are then drilled through the outer sleeve, adhesive and composite tubes, and pins, rivets and the like as shown at 30 are then inserted through it and pulled up, thus locking the adhesive and the composite tube 10 sandwiched between the inner and outer sleeves.

Finally the portion 28 of the outer sleeve is welded, bonded or mechanically secured to the exposed portion of the inner sleeve as shown at 30.

Figure 5:
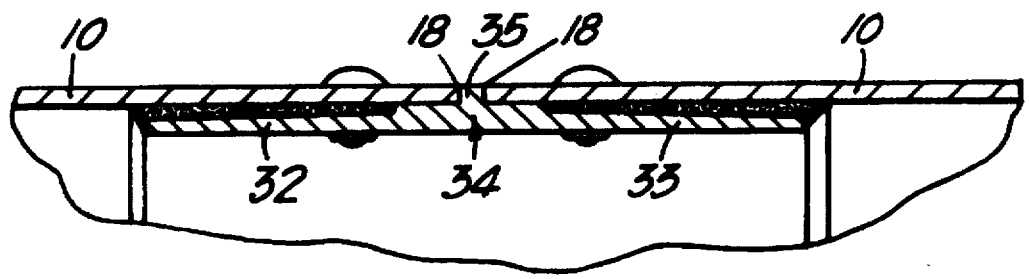
FIGS. 5 to 8 show various shaft to shaft couplings.

FIG. 5, shows a single sided shaft to shaft joint. In this two members 32 and 33 similar to member 11 are formed on a single piece element 34 which has an annular rim 35 which forms two shoulders 18 on its respective sides. The method of assembly is as for the single sided constructions of FIGS. 1 to 3.

Figure 6:
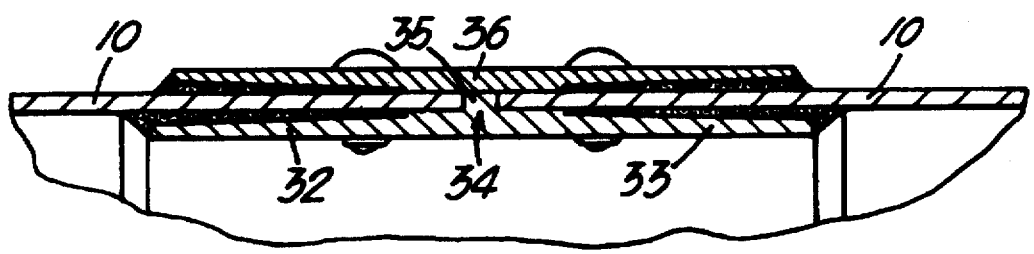

FIG. 6, is a double sided shaft to shaft joint, the assembly an arrangement of which is similar to the joint of FIG. 4 with a single outer sleeve 36 forming the double sided joint.

Figure 7:
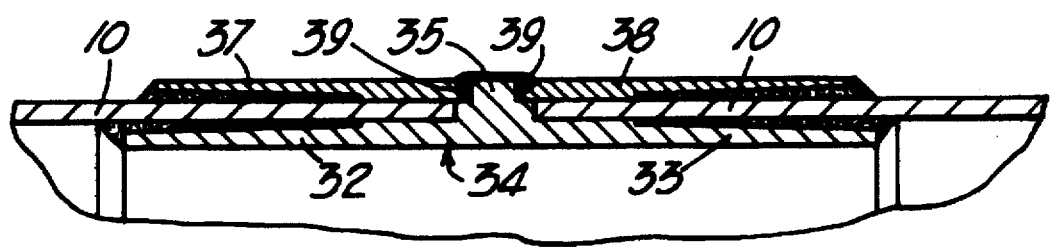

FIG. 7, shows a similar arrangement to FIG. 6, but with two separate sleeves 37 and 38 forming the outer sleeves and welded to the rib 35 at 39.

Figure 8:
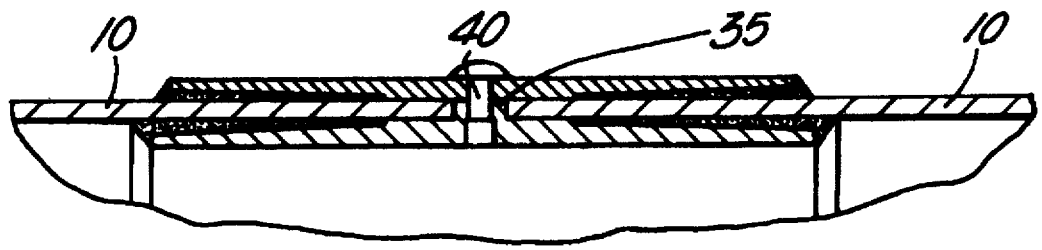

In an alternative arrangement shown in FIG. 8, the single piece member of FIG. 6 is drilled through the rib 35 and a mechanical fastener is inserted as shown at 40.

FIG. 9, shows in more detail view an enlarged portion of the ringed portion shown in FIG. 10. This can be used with any of the joints shown previously.

Figure 11:
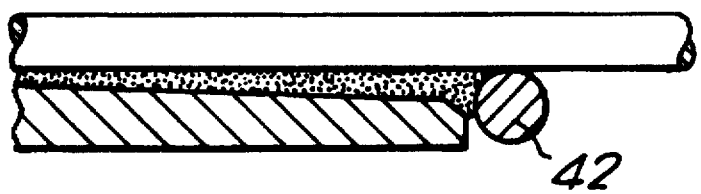
Figure 12:
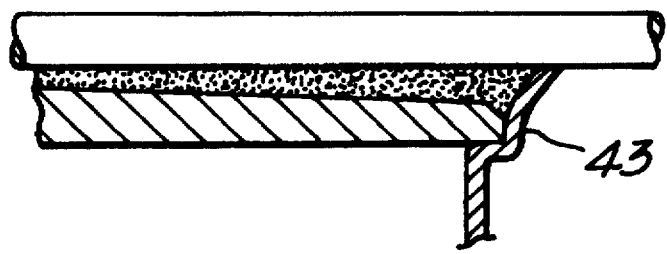

In FIGS. 9, 11 and 12, in order to ensure the stress levels within the joint are kept conservatively low, it is desirable to blend the adhesive smoothly at the end of the joint in a fillet.

If access is restricted to this portion of the joint, then a conformable ring or lip may be butted up against the end of the internal member 11 to ensure correct formation of the adhesive fillet. For example, a triangular ring shown at 41 in FIG. 9 or an O ring shown at 42 in FIG. 11 or a lip seal shown at 42 in FIG. 12 may be used.

In all cases the rubber or plastic of which the material is made, must be sufficiently malleable to allow air and surplus adhesive to escape from the joint under injection pressure and still retain the adhesive fillet until cured.

Due to its low weight the retaining ring or lip can remain within the joint after curing.

The couplings set forth above according to the present invention ensure a high intrinsic service factor under all foreseeable operating conditions and moreover, it can be undertaken under normal workshop conditions with minimal specialist tooling.

I claim:

1. A method for connecting a composite drive shaft to an annular member to form a coupling comprising the steps of:
    locating the shaft over the member;
    injecting adhesive through holes in the shaft to bond the shaft to the member; and subsequently
    providing an external sleeve over the shaft and member; and
    injecting adhesive through holes in the external sleeve to bond the external sleeve to the shaft.

2. The method of claim 1 wherein the shaft is aligned to abut against a shoulder on the member.

3. The method of claim 2 wherein an interference fit is formed between the shaft and a portion of the member which is located adjacent to the shoulder.

4. The method of claim 2 wherein the annular member is profiled.

5. The method of claim 1 wherein an interference fit is formed between the shaft and the member.

6. The method of claim 5 wherein the annular member is profiled.

7. The method of claim 3 wherein the annular member is profiled.

8. The method of claim 1 further comprising the steps of:
    drilling openings through the shaft, adhesive, and member; and
    locating fastening means through the openings to connect the shaft to the member.

9. The method of claim 1 further comprising the steps of:
    drilling openings through the sleeve, adhesive, shaft, adhesive, and member; and
    locating fastening means through the openings to connect the external sleeve and shaft to the member.

10. The method of claim 9 wherein a conformable ring or lip is butted against an end of the member and the adhesive which is injected through the holes in the shaft is profiled by the conformable ring or lip.

11. The method of claim 10 further comprising the steps of:
    encapsulating the coupling with a heat shrink bandage; and applying heat thereto to shrink the heat shrink bandage.

* * * * *